J. STEWART.
DRAFT ATTACHMENT.
APPLICATION FILED OCT. 23, 1911.
1,087,405.
Patented Feb. 17, 1914.
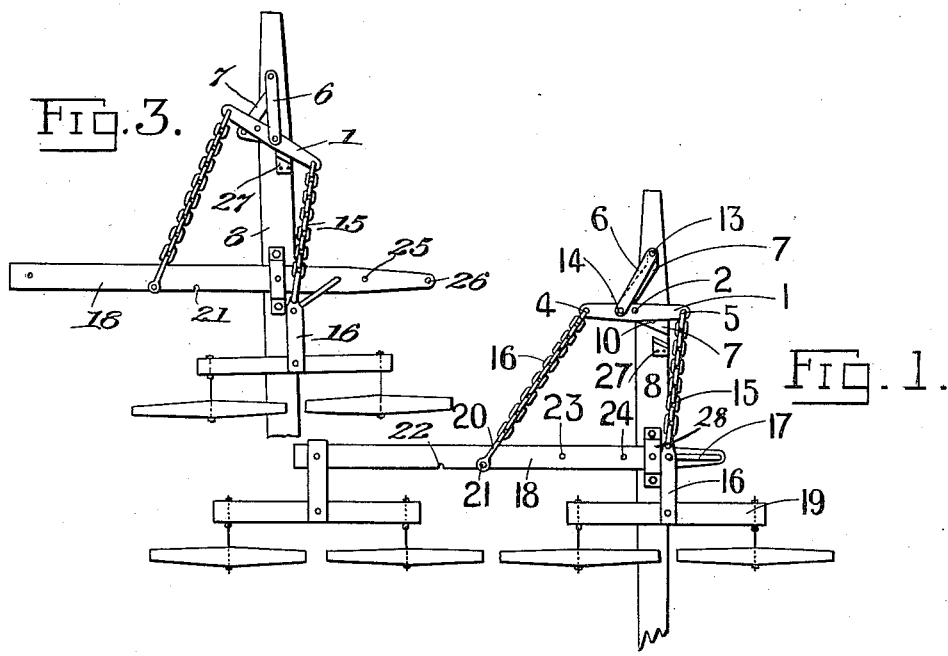
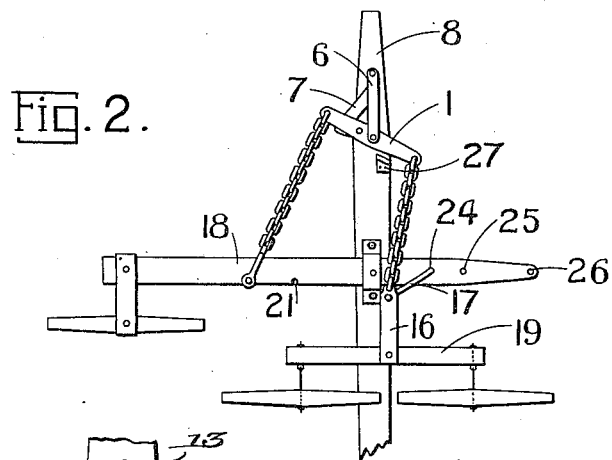
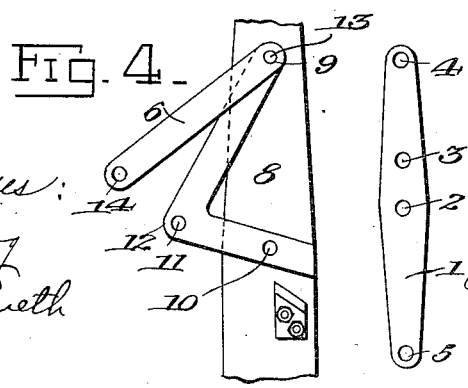
Witnesses:
M. Hefling
H. F. Rueth
Inventor:
John Stewart
by B. Singer
Atty

UNITED STATES PATENT OFFICE.

JOHN STEWART, OF GORE, NEW ZEALAND.

DRAFT ATTACHMENT.

1,087,405.  Specification of Letters Patent.  Patented Feb. 17, 1914.

Application filed October 23, 1911. Serial No. 656,241.

*To all whom it may concern:*

Be it known that I, JOHN STEWART, a subject of the King of Great Britain, residing at Gore, New Zealand, have invented new and useful Improvements in Draft Attachments, of which the following is a specification.

My invention relates to draft attachments for reapers and binders or the like, and the special object of my invention is to enable four horses to be harnessed to a reaper and binder so that all four horses have equal draft although three are on one side of the pole and only one on the other, and the horse next the uncut crop is kept nearly in the same position as with a three horse team. My invention can also be readily converted for use with a three horse team and also for use by two horses in moving the machine from place to place.

In the accompanying drawings illustrating my invention, similar numerals of reference indicate similar parts, and Figure 1 is a top view of my attachments for a four horse team. Fig. 2 is a top view of my attachments converted for a three horse team. Fig. 3 is a top view of the arrangement for two horses. Fig. 4 shows enlarged the devices for adjusting the leverage.

According to my invention a rear swingle bar (1) is provided with a central hole (2), and another hole (3) one third the length of the bar from a hole (4) at one end, another hole (5) being at the other end. This rear bar (1) is pivotally secured by a pin to a bar (6) provided with holes (13) (14) at its ends and pivoted through a bracket (7) on the pole (8) said bracket being provided with a hole (9) (10) at each end and a hole (11) at its bend (12). The chain (15) secured at one end in the hole (5) at the end of the rear bar (1) has its other end secured pivotally to a piece (16). This piece (16) is pivotally attached at its rear end by a bent crank-shaped rod (17) to the cross bar (18) one end of the bent crank-shaped rod (17) entering a hole in the cross bar (18) and the other end entering a hole in the piece (16). The front end of the piece (16) is pivotally secured to the two horse swingle bar (19). The chain (16) secured at one end in the hole (4) at the other end of the rear bar (1) has its other end secured to a grip (20) which is pivotally securable to notches (21) (22) in the cross bar (18). The cross bar (18) is secured to the pole (8) by a bracket (28) through which said pole is slidable and is provided with holes 23, 24, 25, 26 for adjustment.

In use for a four horse team the arrangement of my invention is as shown in Fig. 1 whereby the draft of the four horses is equally distributed. For a three horse team the arrangement is as in Fig. 2 wherein the draft of the three horses is equally distributed. For two horses the arrangement is as shown in Fig. 3 and in this case a stop (27) is provided and secured to the pole (8) so that the rear bar (1) may be held by it against the pull on the chain (15).

Having now described my invention, what I claim as new and desire to secure by Letters Patent is:—

The combination with a wagon pole; of a bracket secured thereto, and projecting from one side thereof; said bracket being provided with a plurality of spaced bolt receiving openings, a cross bar provided with spaced openings, and pivots extending through a selected opening and said pole to provide lever arms of desired length, a rear evener bar provided with a plurality of openings, a bolt passing through a selected opening in the evener bar and through a selected opening in the bracket whereby the relative lengths of the arms of the evener bar and its point of attachment to the bracket may be varied, means for connecting the ends of the evener bar to the cross bar, and swingle trees operatively connected to said cross bar.

In testimony whereof I have signed my name to this specification in the presence of two subscribing witnesses.

JOHN STEWART.

Witnesses:
 ANDREW JOHN PARK,
 ANDREW JOHN PARK, Junior.

---

Copies of this patent may be obtained for five cents each, by addressing the "Commissioner of Patents, Washington, D. C."